United States Patent [19]

Ikuta

[11] Patent Number: 5,043,564

[45] Date of Patent: Aug. 27, 1991

[54] DUAL INTEGRATION TYPE ELECTRO-OPTICAL DISTANCE MEASURING DEVICE WHEREIN THE FIRST INTEGRATION TIME IS REVERSE INTEGRATED

[75] Inventor: Kiyoshi Ikuta, Kanagawa, Japan

[73] Assignee: Canon Kabushiki Kaisha, Tokyo, Japan

[21] Appl. No.: 537,142

[22] Filed: Jun. 12, 1990

Related U.S. Application Data

[63] Continuation of Ser. No. 449,453, Dec. 12, 1989, abandoned, which is a continuation of Ser. No. 265,755, Nov. 1, 1988, abandoned.

[30] Foreign Application Priority Data

Nov. 7, 1987 [JP] Japan ............................ 62-280303

[51] Int. Cl.⁵ .............................................. G01J 1/20
[52] U.S. Cl. .............................. 250/201.4; 250/201.6; 354/403
[58] Field of Search ............ 250/201 AF, 201 R, 208, 250/209, 201.4, 201.6, 208.1, 208.2; 356/1, 4; 354/403, 402, 25

[56] References Cited

U.S. PATENT DOCUMENTS

| | | | |
|---|---|---|---|
| 4,251,145 | 2/1981 | Cocron et al. ...................... 354/25 |
| 4,291,223 | 9/1981 | Sakane et al. ................. 250/201 AF |
| 4,300,824 | 11/1981 | Tokuda et al. ....................... 354/25 |
| 4,389,565 | 6/1983 | Numata ........................ 250/201 AF |
| 4,564,296 | 1/1986 | Oshida .......................... 250/201 AF |
| 4,686,359 | 8/1987 | Yokoi et al. .................. 250/201 AF |
| 4,720,723 | 1/1988 | Harunari et al. .................... 354/403 |

FOREIGN PATENT DOCUMENTS

59-136870 6/1984 Japan .

*Primary Examiner*—David C. Nelms
*Attorney, Agent, or Firm*—Fitzpatrick, Cella, Harper & Scinto

[57] ABSTRACT

A distance measuring device of the dual integration type in which a signal light is projected onto an object whose distance is to be measured has light receiving means receptive of the reflection of the signal light from the object and produces two output signals of variable ratio depending on the object distance. After either or both of the two outputs have been integrated for a first integration time, an integrated value for the first integration time is reversely integrated by an output of the light receiving means different from the output or outputs which have been integrated for the first integration time, so as to measure the distance to the object by seeking a second integration time required until the integrated value for the first integration time has reached a predetermined value by the reverse integration. The present invention proposes detecting means for detecting whether or not an integration level in the first integration time has reached the predetermined value, and integration time variable means for varying the first integration time in accordance with a period of time required for the integration level in the first integration time to reach the predetermined value.

22 Claims, 7 Drawing Sheets

FIG.10

DUAL INTEGRATION TYPE ELECTRO-OPTICAL DISTANCE MEASURING DEVICE WHEREIN THE FIRST INTEGRATION TIME IS REVERSE INTEGRATED

This application is a continuation of application Ser. No. 449,453 filed Dec. 12, 1989, now abandoned, which is a continuation of Ser. No. 265,755, filed Nov. 1, 1988, both now abandoned.

BACKGROUND OF THE INVENTION

1. FIeld of the Invention

This invention relates to a distance measuring device for measuring the distance to an object and, more particularly, to improvements in the distance measuring device of a dual integration type in which a signal light is projected onto the object and the ratio of two outputs from light receiving means for receiving the reflection of that signal light (which ratio varies depending on the distance to the object) is determined by dual integration to obtain the measured value of the distance.

2. Description of the Related Art

In the so-called active type of distance measuring device which projects a signal light and receives the reflection of that signal light to obtain the measured value of the distance, there have been proposed various methods of computing the distance from the device to an object to be photographed from the ratio of two received light outputs of variable ratio depending on the object distance. For example, one method is to logarithmically compress each of the above-described received light outputs and then subtract one from the other. Another method is to A/D convert the above-described two received light outputs and then perform calculations with a microcomputer. Of these methods the ones using dual integration disclosed in U.S. Pat. No. 4,720,723 and others have the advantage that one integration circuit is sufficient, thus reducing the circuit scale, that because one circuit is time-divisionally used in common, and the problem of matching the circuit constants disappears, etc.

Meanwhile, in compact cameras employing devices of this kind, as the capability of changing the focal length of the photographic lens in discrete values or of zooming is introduced, the range of distances to be measured is widened. Hence, a distance measuring ability from a farther distance to a nearer distance is desired. This means the dynamic range of the signal processing circuit must be widened. The reason is that the signal strength varies in inverse proportion to the square of the distance to the object. Now, suppose the circuit is designed to be able to perform calculations with the signal strength at the longest distance to be measured, in other words, at the time of the weakest signal. Then the near distance object may saturate the circuit. Conversely when the circuit is so designed as not to saturate at the near distance, the signal becomes weak on long distance objects, the calculations cannot be performed accurately and reliably, causing production of errors in the distance measurement. Particularly, an error in that circuit which performs signal computation becomes a distance measurement error. Hence its influence is very great.

A so-called automatic gain control (AGC) circuit may be provided for automatically varying the mu-factor of the signal circuit depending on the signal strength. But, usually a circuit of this kind has the problems that because of the necessity of a feedback network, the circuit becomes complicated, and because the AGC operation must be carried out before the distance measuring operation, the distance measuring time is increased by that amount, etc.

SUMMARY OF THE INVENTION

An object of the invention is to solve the above-described problems and to provide a distance measuring device which enables the dynamic range to be widened without causing the circuit structure to be complicated so that distance measurements from longer distances to nearer distances are made possible. The invention also enables distance measurements to be carried out in a shorter time.

To achieve the above-described object, the present invention provides a distance measuring device of the dual integration type in which a signal light is projected onto an object whose distance is to be measured, the reflection of the signal light from the object is received by light receiving means to produce two output signals of variable ratio depending on the object distance, and, after either or both of the two outputs are integrated for a first integration time, an integrated value for the first integration time is reversely integrated by an output of the light receiving means different from the output or outputs of the light receiving means which have been integrated for the first integration time, so as to measure the distance to the object by seeking a second integration time required until the integrated value for the first integration time reaches a predetermined value by the reverse integration, comprising detecting means for detecting whether or not an integration level in the first integration time has reached a predetermined value, and integration time variable means for varying the first integration time in accordance with a period of time required for the integration level in the first integration time to reach the predetermined value.

Other objects of the invention will become apparent from the concrete embodiments shown below.

DETAILED DESCRIPTION OF THE PREFERRED EMBODIMENTS

In the following, the invention is described in detail on the basis of the illustrated embodiments.

Figure 2:
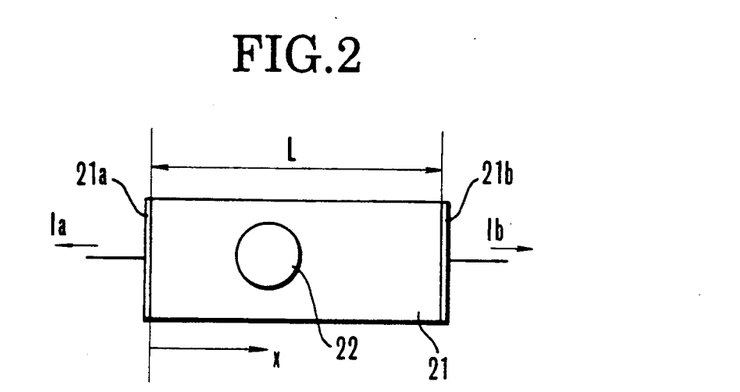
FIG. 2 is a plan view illustrating the semiconductor position detector used in the device of the embodiment of the invention.

In FIG. 2, 21 is a semiconductor position detector (hereinafter referred to as "PSD") having electrodes 21a and 21b. A signal light projected from light projecting means (not shown) onto an object whose distance is to be measured is reflected therefrom to impinge on the PSD 21 on which a reflected spot light 22 is formed. The PSD 21 produces the position of the center of gravity of the spot light 22 from each of the electrodes 21a and 21b.

Now, letting the length of the space between the electrodes 21a and 21b of the PSD 21 be denoted by L, the distance from the electrode 21a to the center of gravity of the spot light 22 by x, and photocurrents produced from the electrodes 21a and 21b, Ia and Ib respectively, the following relation is obtained:

$$Ib/(Ia+Ib) = x/L \qquad (1)$$

That is, $Ib/(Ia+Ib)$ is proportional to the center of gravity x of the spot light 22. Therefore, to seek $Ib/(Ia+Ib)$ is equal to seeking the distance from the electrode 21a to the center of gravity of the spot light 22. Since the position of incidence of the reflected spot light 22 corresponds to the distance to the object, $Ib/(Ia+Ib)$ corresponds to the distance to the object.

Figure 3:
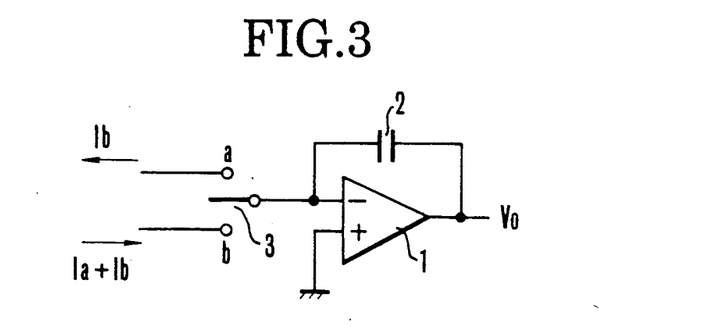
FIG. 3 is an electrical circuit diagram illustrating the structure of an integration circuit for performing dual integration in the distance measuring device.

FIG. 3 shows a circuit portion which performs the computation of the above-described equation (1). 1 is an operational amplifier which serves as an integration circuit; 2 is an integration capacitor; and 3 is a switch which is changed over by a circuit (not shown) to output the photocurrents Ib and Ia+Ib from the above-described PSD 21 in reverse directions.

Figure 4:
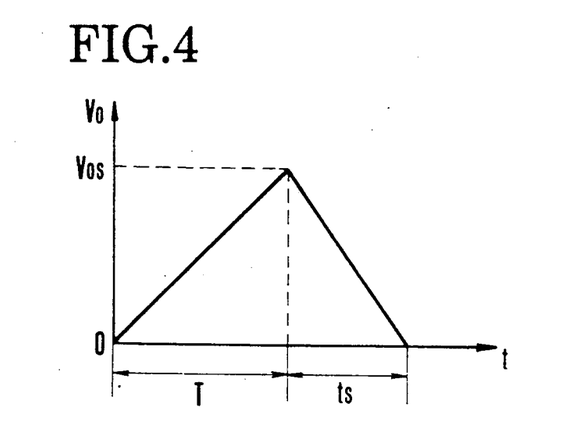
FIG. 4 and FIG. 5 are graphs for explaining the integration output states of the integration circuit shown in FIG. 3.

Now, when no charge exists in the integration capacitor 2 at all, the switch 3 is set to the contact "a" side to integrate the photocurrent Ib from the above-described PSD 21 for a time T (hereinafter called "first integration"), and then set to the contact "b" side to reversely integrate the photocurrent (Ia+Ib) from the above-described PSD 21 (hereinafter called "second integration"). Letting "ts" denote a period of time that it takes for the charge of the integration capacitor 2 to reach the initial value, the output Vo of the operational amplifier 1 varies as shown in FIG. 4. Here, when the capacitance of the integration capacitor 2 is C, the following equation is established, as is apparent from FIG. 4.

$$Vos = Ib \cdot T/C = (Ia+Ib)ts/C \qquad (2)$$

By solving for ts, $$ts = (Ib/(Ia+Ib))T \qquad (3)$$

is obtained. From the equation (1), $Ib/(Ia+Ib)$ corresponds to the position "x" of the center of gravity of the spot light 22. Hence, the equation (1) and the equation (3) give $$ts = (x/L)T \qquad (4)$$

That is, the second integration time "ts" corresponds to the position "x" of the spot light 22, therefore, to the distance to an object to be photographed.

Figure 5:
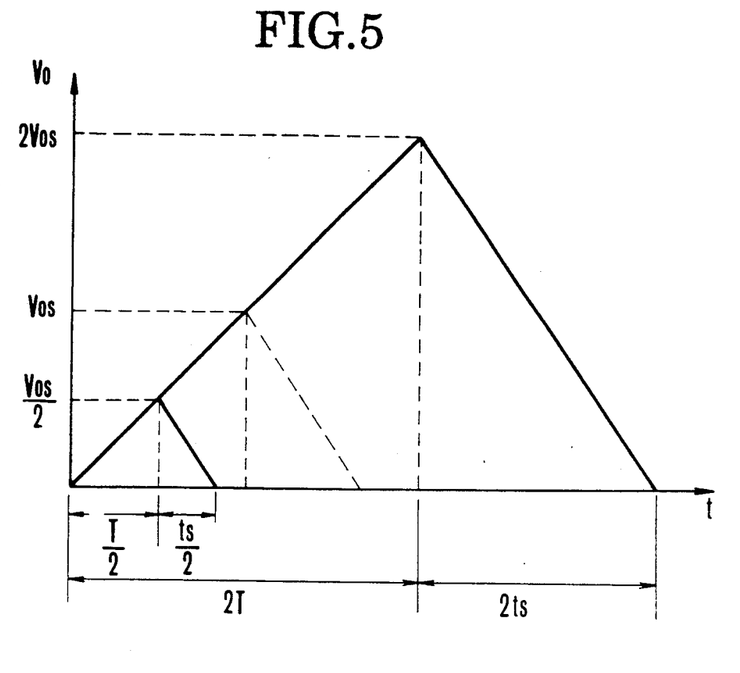

Here, if the first integration time is changed from T to T/2, the output Vos of the operational amplifier 1 becomes Vos/2. If the first integration time is made to be 2T, it becomes 2Vos (see FIG. 5).

In the above, the first integration time and the output of the operational amplifier 1 are in a proportional relationship. Depending on the first integration time, despite the constant of the capacitance of the integration capacitor 2, the output of the operational amplifier 1 is caused to change. Thus, it can be considered that the apparent gain of the operational amplifier 1 is changing. Further, it is understood from the equation (4) that the second integration time "ts" which corresponds to the distance information also is in proportional relationship with the first integration time. In the following embodiments, it is intended that without changing the above-mentioned circuit constants at all, the apparent gain of the operational amplifier 1 is changed by varying the first integration time in the dual integration.

Figure 1:
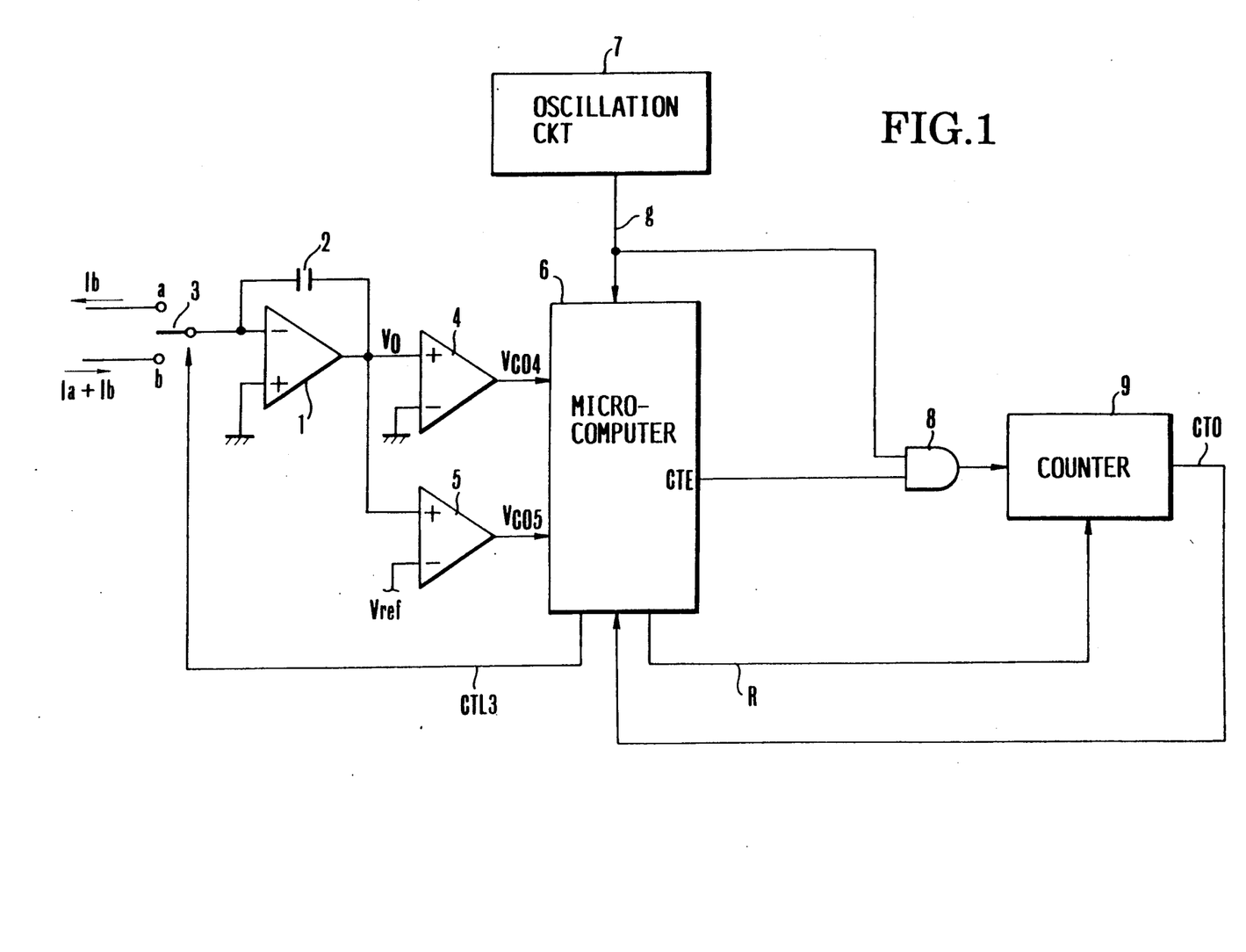
FIG. 1 is a block diagram illustrating an embodiment of a distance measuring device according to the invention.

FIG. 1 shows an embodiment for realizing the foregoing features, wherein the same parts as those in FIG. 3 are denoted by the same reference numerals. 4 and 5 are comparators, to each of the non-inverting input terminals of which the output of the operational amplifier 1 is input. Again, the inverting input terminal of the comparator 4 is grounded, and a reference voltage Vref is input to the inverting input terminal of the comparator 5. The outputs Vco4 and Vco5 of the comparators 4 and 5 are input to a microcomputer 6. By its output signal CTL3, the changeover control of the switch 3, etc. is carried out. 7 is an oscillation circuit for generating a clock "g" which becomes a reference; 8 is a 2-input AND gate; 9 is a counter which is reset by an output signal R from the microcomputer 6, the output CT0 of the counter 9 being input to the microcomputer 6.

Figure 6:
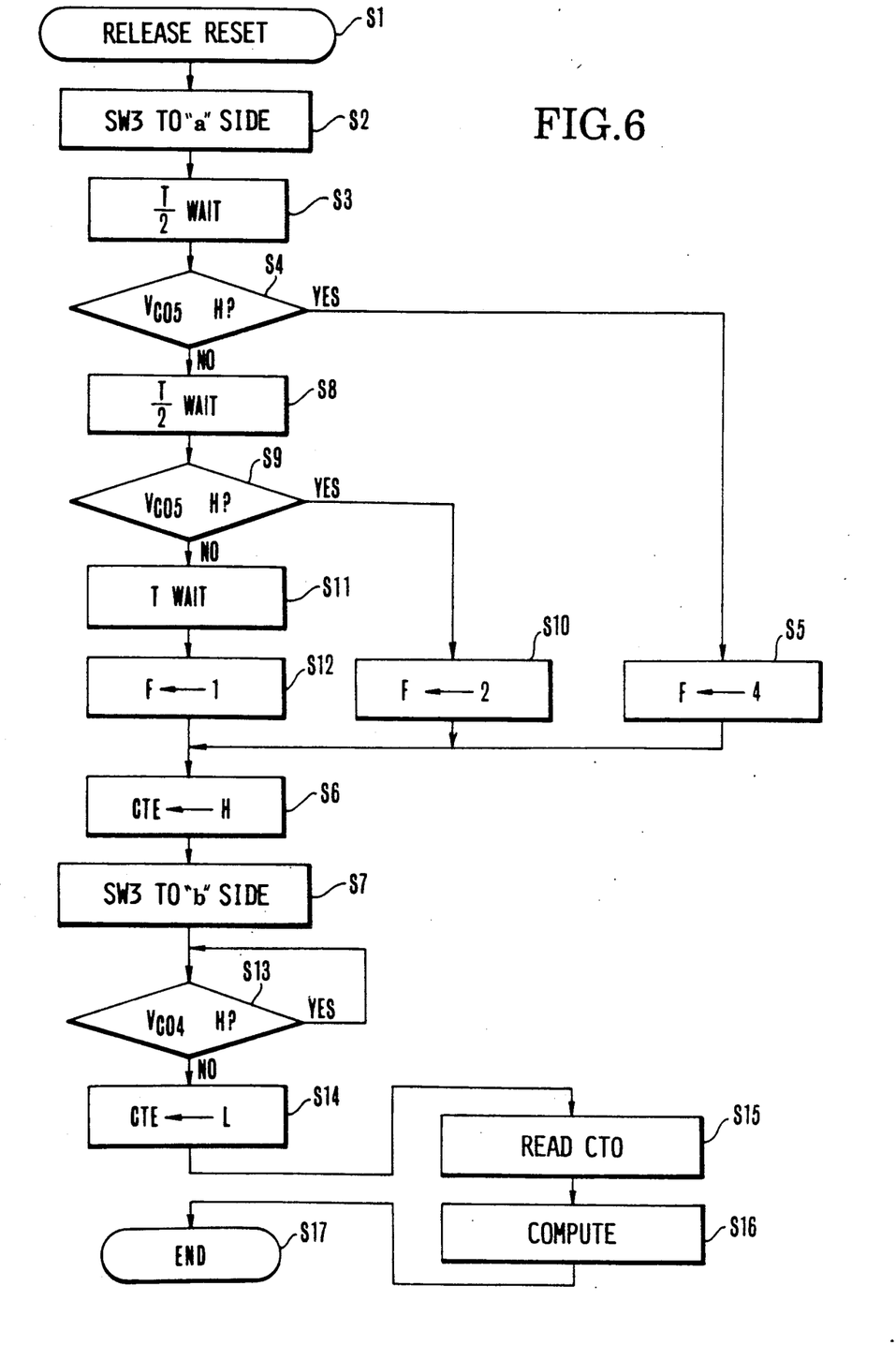
FIG. 6 is a flowchart illustrating the operation of the device of the embodiment shown in FIG. 1.
Figure 7:
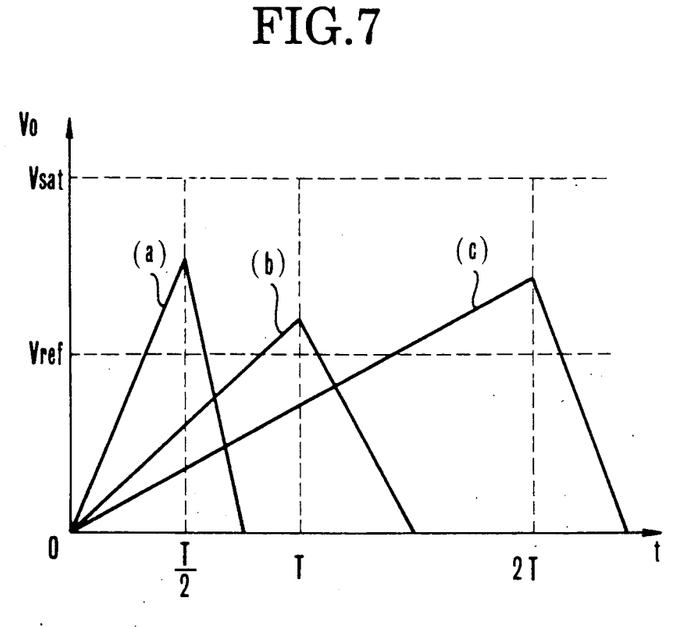
FIG. 7 is a graph to explanation of the operation of the FIG. 1 embodiment.

Next, the operation of the FIG. 1 embodiment will be described by using the flowchart of FIG. 6. In the state that there is no charge in the integration capacitor 2, the microcomputer 6 first releases the resetting of the counter 9 (step S1) and changes over the switch 3 to the contact "a" side (step S2). Thereby, the first integration for integrating the photocurrent Ib of the PSD 21 receiving the reflected light is started by the operational amplifier 1. As its output Vo rises, when that output Vo exceeds the reference voltage Vref, the output signal Vco5 of the comparator 5 inverts to high level. Next, when the microcomputer 6 determines that the time T/2 has elapsed from the time at which it has changed over the switch 3 to the contact "a" side (step S3), it examines whether the output signal Vco5 of the comparator 5 is at high level or low level (step S4). If it is at high level, that is, the output Vo of the operational amplifier 1 is a larger value than the reference voltage Vref, an internal variable F is set to "4" (step S5), causing an output port CTE to become high level (step S6). At the same time, to bring the first integration to an end and to start the second integration, the microcomputer 6 changes over the switch 3 to the contact "b" side (step S7). Thereby the photocurrent (Ia+Ib) of the PSD 21 receiving the reflected light of the signal light projected by the light projecting means (not shown) is integrated in the reverse direction by the operational amplifier 1. Hence the output Vo of the operational amplifier 1 is lowering. This behavior is shown by a line (a) of FIG. 7.

In the above-described step S4, if the output signal Vco5 of the comparator 5 remains at low level, then the output state of the output signal Vco5 is examined after the lapse of another time T/2 from the above-described time, in other words, after the lapse of a time T from the start of the first integration (step S8). If it inverts to high level, then the variable F is set to "2" (step S10), causing the output port CTE to become high level (step S6) and the switch 3 to change over to the contact "b" side (step S7). Hence the second integration starts. This behavior is shown by a line (b) of FIG. 7.

In the above-described step S9, if the output signal $V_{co_5}$ of the comparator 5 has remained at a low level, then when it is determined that another time T from the above-described time, (in other words, a time 2T from the start of the first integration (step S11) has passed, the variable F is set to "1" regardless of the output state of the output signal $V_{co_5}$ (Step S12). Hence the second integration starts. This behavior is shown by a line (c) of FIG. 7.

Here, the gradient of the rising output Vo of the operational amplifier 1 depends on the magnitude of the photocurrent Ib. That the gradient is large means that the photocurrent Ib is large. This is the case of near distances or high reflectance. Also, the reference voltage Vref is set to half the value of the output saturation voltage Vsat of the operational amplifier 1 (a higher value than the threshold level of whether or not distance measurement is possible). Thus, the operational amplifier 1 is prevented from saturating.

In such a manner, the first integration time is changed in values of T/2, T and 2T depending on the gradient of the integrating output, i.e., the magnitude of the photocurrent Ib. Thus, the apparent gain of the integrator is made to alter.

As the first integration is completed as has been described above, the switch 3 is changed over to the contact "b" side, and the second integration is started. From this time onward, the output Vo of the operational amplifier 1 goes low. After that, when the output Vo of the operational amplifier 1 returns to the initial value or "0", the output signal $V_{co_4}$ of the comparator 4 becomes low level. Hence the time from the moment at which the switch 3 has changed over to the contact "b" side to the moment at which the output signal $V_{co_4}$ of the comparator 4 inverts to low level becomes the second integration time, that is, the measured distance information. The microcomputer 6, after the start of the second integration, monitors the output signal $V_{co_4}$ of the comparator 4. When that output signal $V_{co_4}$ becomes low level, it immediately changes the above-described output port CTE to low level (step S14). Such a change of the output port CTE to low level causes the AND gate 8 to close so that the inputting of the clock to the counter 9 stops. Thus, the counter 9 has counted the second integration time.

Next, the microcomputer 6 reads the counted value Nts appearing at the output CT0 of the counter 9 (step S15). From the read counted value Nts, a distance measurement data Nx is then sought by the following computation (Step S16).

$$Nx = F \times Nts \qquad (5)$$

Here, the variable F in the program of the microcomputer 6 is "4" when the first integration time is T/2, "2" when it is T, or "1" when it is 2T. The ratio of the variable F is just the inverse ratio of the first integration time. Therefore, the distance measurement data Nx obtained from the computation of the equation (5), if the distance to the object is constant, becomes constant irrelevant of the first integration time. In other words, from the distance measurement data Nx, it is possible to know the distance to the object.

Figure 8:
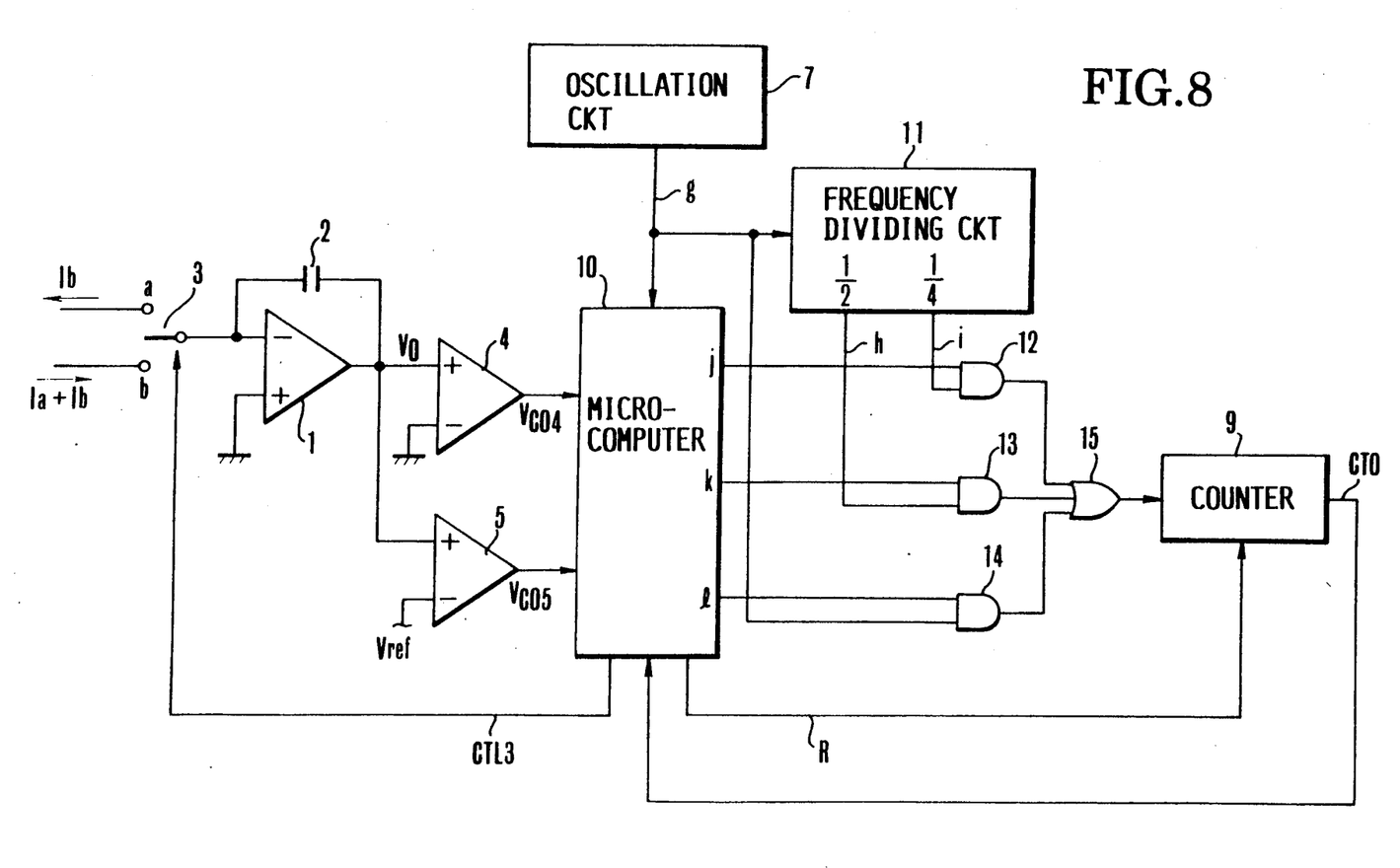
FIG. 8 is a block diagram illustrating another embodiment of the invention.
Figure 9:
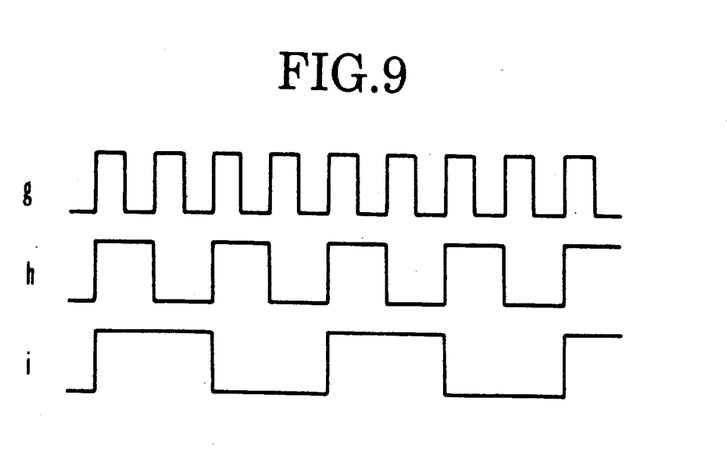
FIG. 9 is a waveform diagram illustrating clock signals from an oscillation circuit and a frequency dividing circuit shown in FIG. 8.

FIG. 8 shows another embodiment of the invention, wherein the same parts as those of FIG. 1 are denoted by the same reference numerals. In FIG. 8, 10 is a microcomputer which is similar to the above-described microcomputer 6; 11 is a frequency dividing circuit for producing clocks signals "h" and "i" of periods equal to 2 times and 4 times the period of the clock "g" shown in FIG. 9; 12, 13 and 14 are 2-input AND gates; and 15 is a 3-input OR gate.

Figure 10:
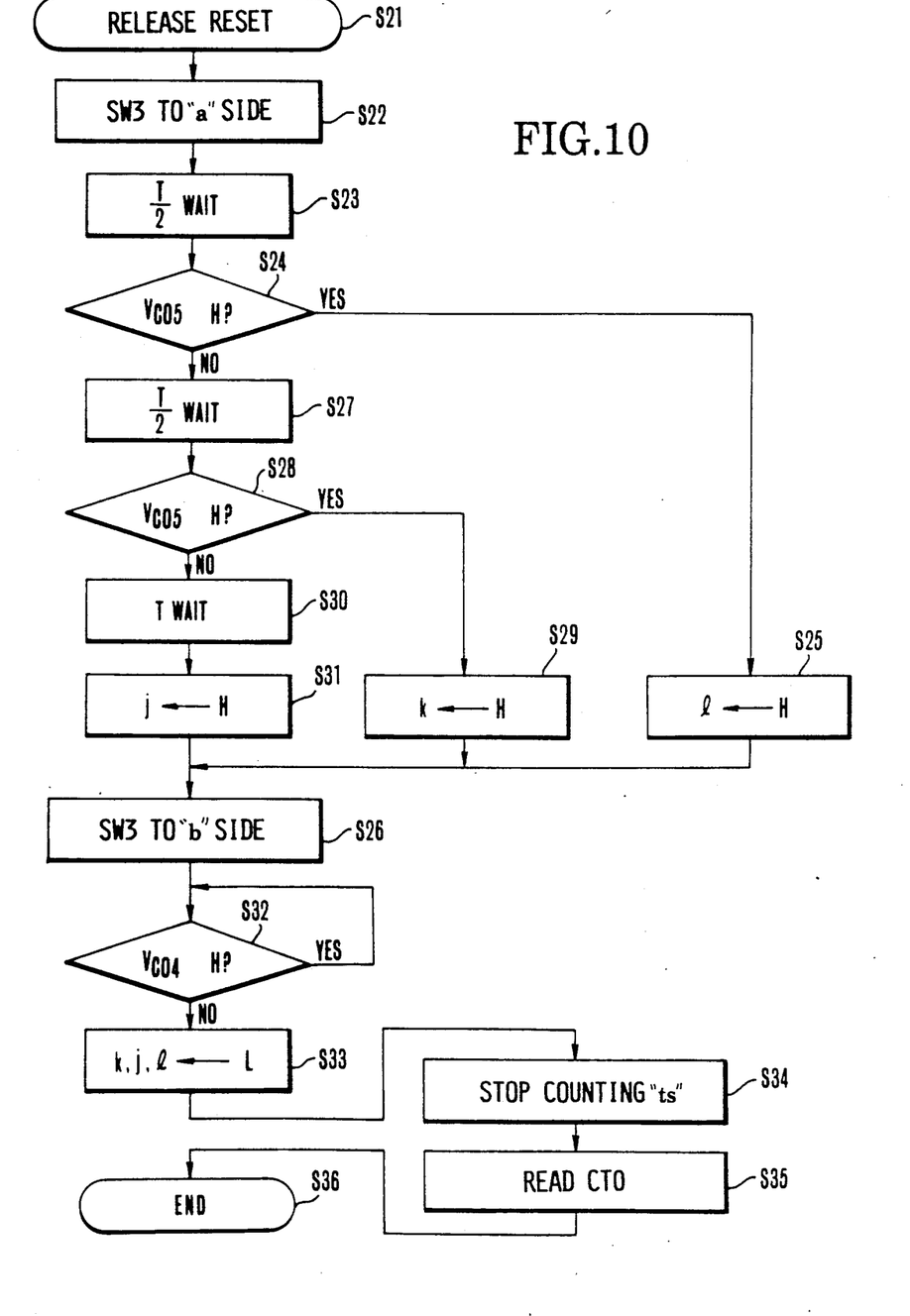
FIG. 10 is a flowchart illustrating the operation of the device of the embodiment shown in FIG. 8.

Next, the operation of the FIG. 8 embodiment will be described by using the flowchart of FIG. 10. Similar to the FIG. 1 embodiment, in the state that there is no charge in the integration capacitor 2, the microcomputer 10 changes the switch 3 over to the contact "a" side (step S22), initiating the above-described integration. If the output signal $V_{co_5}$ of the comparator 5 is at high level at a time T/2 from the start of the first integration (steps S23, S24), the microcomputer 10 changes an output port "l" to H level (step S25), and then changes the switch 3 to the contact "b" side to terminate the first integration and to start the above-mentioned second integration (step S26).

Again, in the above-described step S24, if the output signal $V_{co_5}$ of the comparator 5 has remained at a low level, then after the lapse of another time of T/2 from the above-described time, that is, after the lapse of a time of T from the start of the first integration, the state of the output signal $V_{co_5}$ is examined (steps S27, S28). If it has inverted to high level, the microcomputer 10 changes its output port "k" to high level (step S29) and changes over the switch 3 to the contact "b" side (step S26), starting the second integration.

In the above-described step S28, if the output signal $V_{co_5}$ of the comparator 5 has remained at a low level, then after the lapse of another time T from the above-described time, that is, when a time of 2T from the start of the first integration has passed (step S30), the microcomputer 10 changes its output port "j" to high level regardless of the output state of the output signal $V_{co_5}$ (step S31), starting the second integration.

The microcomputer 10 after the start of the second integration monitors the state of the output signal $V_{co_4}$ of the comparator 4 (step S32). When that output signal $V_{co_4}$ becomes low level, the microcomputer 10 changes its output ports "j", "k" and "l", to L level (step S33), causing the outputs of the AND gates 12-14 to become low level, so that the inputting of the clock signal to the counter 9 stops (step S34). Thus, in the counter 9, the second integration time has been counted.

Here, when the first integration time is "T/2", the output port "l" becomes high level, so that the AND gate 14 opens. Therefore, the counter 9 cooperates with the clock "g" to count the second integration time. Similarly, when the first integration time is "T", the output port "k" becomes high level, causing the AND gate 13 to open, so that the counter 9 cooperates with the clock "h" to count the second integration time. When the first integration time is "2T", the output port "j" becomes high level, causing the AND gate 12 to open, so that the counter 9 cooperates with the clock "i" to count the second integration time. The ratio of the periods of the above-described clocks "g", "h" and "i" corresponds to the ratio of the first integration times T/2, T and 2T. Therefore, in the above-described equation (4), even if the value of "x" is the same, the second integration time "ts" also changes in response to a change of the first integration time. But, by changing the period of the clock of the counter 9 for counting the second integration time "ts" by changing the first integration time T as has been described above, if the value "x" is constant, the output of the counter 9 also becomes constant. In other words, the counted value Nx of the counter 9 produces a value which corresponds to the distance always in 1:1 relation regardless of the change of the first integration time.

The microcomputer 10 reads in the counted value Nx produced at the output CT0 of the counter 9 (step S35), and uses it as the distance measurement data.

According to this embodiment, in the distance measuring device of the active type in which of the two signals of variable ratio depending on the object distance (in this embodiment, the photocurrent (Ia"Ib) and the photocurrent Ib), one signal is increasingly integrated for a constant time (the first integration time), and then reverse integration is carried out until that integrated value reaches the initial value (for the second integration time). Thus, the object distance information is computed by the ratio of the first integration time and second integration time, and the first integration time is made to change depending on the rising rate (gradient) of integration of the output, that is, the magnitudes of the photocurrents Ia and Ib, thereby it is possible to widen the dynamic range of the integration circuit without changing the circuit constants. This produces an advantage such that when the value of the photocurrent Ia or Ib is small, for example, in the case that the object to be photographed lies at a long distance, or in a case where the object to be photographed has a low reflectivity, the first integration time is elongated to heighten the apparent mu-factor with an increase of the integration output, whereby the errors in the computing circuit portion, that is, the errors of distance measurement, are lessened. Conversely when the value of the photocurrent Ia or Ib is large, for example, in a case where the object to be photographed lies at a short distance, or in a case where the reflectivity of the object is high, the first integration time is shortened for the purpose of preventing the integration circuit from saturating. There is also still another advantage in that the shortening of the first integration time leads to a shortening of the overall distance measurement time, which in turn reduces the influence of camera-shake during the shooting operation.

Further, since the gain of the integration circuit, or the first integration time in this embodiment, is determined in the process for performing the first integration, the operation which would otherwise set the circuit gain before the start of the computation as in the prior art becomes unnecessary, and a shorter distance measurement time suffices.

It should be noted that in the embodiment of FIG. 8, the counting of the second integration time ts is carried out by using the counter 9 with a variation of the period of the clock, and even this operation may be performed within the microcomputer 6 or 10. Though in any of the above-described embodiments, the first integration time is changed over among the values T/2, T, 2T, the invention is not confined to this. Two values may be used or four or more values may also be used. In this case, the reference voltage Vref which determines the first integration time must be set to such a value that in a case where the object to be photographed takes its position within the distance measurement possible range, the output Vo does not reach the saturation voltage Vsat of the operational amplifier 1.

Also, though any of the above-described embodiments carries out the first integration by using the photocurrent Ib, and the second integration by using the photocurrent (Ia+Ib), the first integration may be effected by using the photocurrent Ia. Further, it is also needless to say that the first integration may be effected by using the photocurrent (Ia+Ib), while the second integration may be effected by using the photocurrent Ia or Ib.

Furthermore, it goes without saying that the present invention is applicable not only to distance measuring devices, but also to other devices of the dual integration type such as light metering devices.

What is claimed is:

1. A distance measuring device of the dual integration type in which a signal light is projected onto an object whose distance is to be measured, the reflection of the signal light from the object is received by light receiving means to produce two output signals of variable ratio depending on the distance to the object, and after either or both of the two outputs have been integrated for a first integration time, an integrated value for the first integration time is reversely integrated by an output of said light receiving means different from the output or outputs of said light receiving means which have been integrated for the first integration time, so as to measure the distance to the object by seeking a second integration time required until the integrated value for the first integration time reaches a first predetermined value by the reverse integration, comprising:
   (A) detecting means for detecting whether or not an integration level in the first integration time has reached a second predetermined value; and
   (B) integration time variable means for varying the first integration time in accordance with a period of time required for the integration level in the first integration time to reach the second predetermined value.

2. A device according to claim 1, wherein said integration time variable means includes discrimination means for discriminating in each predetermined time whether or not said detecting means has detected that the integration level in the first integration time has reached the predetermined value.

3. A device according to claim 2, wherein said integration time variable means includes terminating means for terminating an integrating operation in the first integration time in response to the discrimination of said discriminating means on the detection of said detecting means.

4. A device according to claim 2, wherein said integration time variable means includes breaking-off means for, after the lapse of a predetermined time, terminating an integrating operation in the first integration time regardless of the detected state of said detecting means.

5. A device according to claim 1, further comprising:
   correcting means for correcting the second integration time in response to the first integration time which is varied by said integration time variable means.

6. A device according to claim 5, wherein said correcting means includes computing means for correcting the second integration time in an inverse ratio of the length of the first integration time which is varied by said integration time variable means.

7. A device according to claim 5, further comprising:

time counting means for counting the second integration time, said time counting means having a time counting period to be varied by said correcting means.

8. A device according to claim 7, wherein said correcting means includes means for varying the time counting period of said time counting means in an inverse ratio of the length of the first integration time which is varied by said integration time variable mans.

9. A device in which after a received light output has been integrated for a first integration time, an integrated value for the first integration time is reversely integrated to seek a second integration time required until the integrated value for the first integration time reaches a first predetermined value by the reverse integration, comprising:
(A) detecting means for detecting whether or not an integration level in the first integration time has reached a second predetermined value; and
(B) integration time variable means for varying the first integration time in accordance with a period of time required for the integration level in the first integration time to reach the second predetermined value.

10. A device according to claim 9, wherein said integration time variable means includes discrimination means for discriminating in each predetermined time whether or not said detecting means has detected that the integration level in the first integration time has reached the predetermined value.

11. A device according to claim 10, wherein said integration time variable means includes terminating means for terminating an integrating operation in the first integration time in response to the discrimination of said discriminating means on the detection of said detecting means.

12. A device according to claim 11, wherein said integration time variable means includes breaking-off means for, after the lapse of a predetermined time, terminating an integrating operation in the first integration time regardless of the detected state of said detecting means.

13. A device according to claim 9, further comprising:
correcting means for correcting the second integration time in response to the first integration time which is varied by said integration time variable means.

14. A device according to claim 13, wherein said correcting means includes computing means for correcting the second integration time in an inverse ratio of the length of the first integration time which is varied by said integration time variable means.

15. A device according to claim 13, further comprising:
time counting means for counting the second integration time, said time counting means having a time counting period to be varied by said correcting means.

16. A device according to claim 15, wherein said correcting means includes means for varying the time counting period of said time counting means in an inverse ratio of the length of the first integration time which is varied by said integration time variable means.

17. A distance measuring device of the dual integration type in which a distance measuring signal is projected onto an object whose distance is to be measured, the reflection of the distance measuring signal from the object is received by receiving means to produce two output signals of variable ratio depending on the distance to the object, and after either or both of the two outputs have been integrated for a first integration time, an integrated value for the first integration time is reversely integrated by an output of said receiving means different from the output or outputs of said receiving means which have been integrated for the first integration time, so as to measure the distance to the object by seeking a second integration time required until the integrated value for the first integration time reaches a first predetermined value by the reverse integration, comprising:
(A) a detecting means for detecting whether or not an integration level in the first integration time has reached a second predetermined value, and
(B) integration time variable means for varying the first integration time in accordance with a period of time required for the integration level in the first integration time to reach the second predetermined value.

18. A distance measuring device of the type in which (a) a distance measuring signal is projected to an object whose distance is to be measured, (b) the reflection of the distance measuring signal from the object is received by receiving means to produce a plurality of output signals of variable ratio, said ratio being determined depending on a ratio of an integrating speed of a part or the whole of said plurality of output signals, and (c) the distance to the object is measured on the basis of the ratio of said plurality of output signals thus determined, comprising:
(A) standard time setting means for setting an integrating operation time used as a standard for determining the ratio of the integrating speed;
(B) detecting means for detecting whether or not a level of integration performed during the standard integration operation timing has reached a predetermined value; and
(C) varying means for varying the standard integrating operation time set by said standard time setting means in correspondence to a time required by said level of the integration performed during the standard integrating operation time to reach the predetermined value.

19. A device according to claim 18, wherein aid distance measuring signal includes signal light.

20. A device according to claim 18, wherein said varying means includes judging means for judging, for every predetermined period of time, whether said detecting means has detected that the level of integration performed during the standard integrating operation time has reached the predetermined value.

21. A device according to claim 20, wherein said varying means includes terminating means for terminating the integrating operation performed during the standard integrating operation time in response to the judgement of said judging means.

22. A device according to claim 21, wherein said varying means includes finishing means for finishing the integrating operation performed during the standard integrating operation time irrespective of the detection of said detecting means.

* * * * *

UNITED STATES PATENT AND TRADEMARK OFFICE
CERTIFICATE OF CORRECTION

PATENT NO. : 5,043,564

DATED : August 27, 1991

INVENTOR(S) : Kiyoshi Ikuta

It is certified that error appears in the above-identified patent and that said Letters Patent is hereby corrected as shown below:

COLUMN 1:

Line 13, "FIeld" should read --Field--.

COLUMN 2:

Line 60, "explanation of" should read --explain--.

COLUMN 4:

Line 64, "lowering" should read --lowered--.

COLUMN 7:

Line 17, "photocurrent (Ia"Ib) should read --photocurrent (Ia+Ib)--.

Line 62, "values T/2." should read --values T/2,--.

COLUMN 9:

Line 9, "said integration time variable mans" should read --said integration time variable means--.

UNITED STATES PATENT AND TRADEMARK OFFICE
CERTIFICATE OF CORRECTION

PATENT NO. : 5,043,564

DATED : August 27, 1991

INVENTOR(S) : Kiyoshi Ikuta

It is certified that error appears in the above-identified patent and that said Letters Patent is hereby corrected as shown below:

<u>COLUMN 10</u>:

Line 40, "timing" should read --time--.

Line 48, "aid" should read --said--.

Signed and Sealed this

Ninth Day of March, 1993

Attest:

STEPHEN G. KUNIN

Attesting Officer

Acting Commissioner of Patents and Trademarks